May 8, 1934.  F. B. LITTLE  1,958,053
ELECTRIC CONTROL FOR SOUND AMPLIFYING SYSTEMS
Filed May 18, 1932  5 Sheets-Sheet 1

Fig. 1.

Witnesses:
Harry R. L. White.

Inventor
Frederick B. Little
By Edward Jay Wilson
atty

May 8, 1934. F. B. LITTLE 1,958,053
ELECTRIC CONTROL FOR SOUND AMPLIFYING SYSTEMS
Filed May 18, 1932 5 Sheets-Sheet 2

May 8, 1934.  F. B. LITTLE  1,958,053
ELECTRIC CONTROL FOR SOUND AMPLIFYING SYSTEMS
Filed May 18, 1932  5 Sheets-Sheet 3

Witnesses:
Harry R. L. White

Inventor
Frederick B. Little
By Edward Fay Wilson
Atty

May 8, 1934.    F. B. LITTLE    1,958,053
ELECTRIC CONTROL FOR SOUND AMPLIFYING SYSTEMS
Filed May 18, 1932    5 Sheets-Sheet 4

Witnesses
Harry R L White

Inventor
Frederick B Little
By Edward Fay Wilson
Atty

Patented May 8, 1934

1,958,053

UNITED STATES PATENT OFFICE 1,958,053

ELECTRIC CONTROL FOR SOUND AMPLIFYING SYSTEMS

Frederick B. Little, Chicago, Ill., assignor to Ella Deagan, Chicago, Ill.

Application May 18, 1932, Serial No. 612,053

9 Claims. (Cl. 84—103)

This invention relates to a unique electrical mechanism for automatically controlling the operation of a sound amplifying mechanism which includes an electric power supply or service circuit, a current rectifier and motor circuit, a plate circuit, a microphone circuit, and various other operating circuits.

In the manipulation of electrically amplifying sound such as music for projection into the air as from a church tower or otherwise, several electric circuits have to be closed, one after the other, in order that the various delicate parts such as the amplifier tubes may be protected from injury. For instance, the tubes must be heated before the full current is turned on and various other circuits should be closed in sequence so that unwanted sounds shall not be amplified and broadcast.

The object of the invention is to provide a relatively simple and dependable mechanism, which is preferably clock or time controlled, and is arranged and adapted at predetermined times to automatically start the mechanism into operation, and which mechanism is arranged to first close the service or power circuit and send the service current into the amplifying tubes for preliminarily heating them and into the several devices such as transformers and rectifiers of the various stages of the amplifying circuit, then later to close the plate circuit of the power and rectifying tubes, thereby supplying the tubes with the necessary high voltage, and by a second arm to close a supply circuit to a rectifier for operating the player and also for supplying current to the rectifiers or motor generators, as the case may be, for the purpose of supplying D. C. current to the field coils of the loud speaker units, then to close a circuit in which the sound to be amplified originates, such as an automatic player circuit. This timing control for successively closing the several circuits is an important feature of the invention.

A particular object of the invention is to provide an automatically operable mechanism by which an amplified sound program may be delivered to the air from a relatively small source of sound and directed into the air from a tower to simulate the playing of church chimes or other original sound producing means, or used inside a building or outside as a public address system.

Another feature of the invention relates to an automatic means for short circuiting the microphone circuit to prevent the transmission of undesired noises or impulses during the starting periods.

Another feature of the invention relates to simple automatic means for closing and opening the filament or carbon circuit of the microphone, as the case may be, the object being to assure the opening of the circuit when the mechanism is not in operation.

Another important feature of the invention relates to means whereby the same performance, that is, the automatic operations of starting the mechanism, can be accomplished from a remote control station or from a number of different stations.

Another feature of the invention relates to the simple arrangement which includes an automatic player arranged for producing a certain program and by which arrangement the mechanism can be started into operation to produce the program either automatically by the time controlled circuit closing mechanism or manually, if desired, by a simple push button switch, and which will operate to automatically stop the mechanism when the program is finished.

Another feature relates to the convenience of arranging the mechanism so that certain circuits are open and incapable of functioning without, in any manner, disturbing the normal operation of the other parts of the mechanism.

To the accomplishment of the above and associated ends, the invention consists in the arrangement of parts, devices, mechanisms and circuits hereinafter fully described and particularly pointed out in the appended claims, the accompanying drawings forming part of this specification and the following description setting forth in detail one embodiment exemplifying the invention, such disclosed arrangement of parts, devices, mechanisms and circuits, and combinations thereof constituting, however, but one of various applications of the principle of the invention.

The system illustrated in the drawings comprises a microphone A, which is used to pick up the sound to be amplified, some source of sound such as a set of musical chimes B, suitable amplifying device used in the general practice of amplifying sound, loud speakers D, some kind of sound originator such as an automatic player E arranged and adapted to sound the musical chimes B, and a mechanism shown on the panel F for starting the system into operation. Connected with the system is a source of supply, preferably of 110 volt A. C. current, but it should be understood that the system is capable of being arranged to work with any suitable current supply.

The system also includes preferably a clock G operated by a synchronized motor, a switch mechanism H for closing the several main circuits in the proper time relations and also electrically operated switches, and connecting circuits. In connection with the main devices as mentioned above, are many subsidiary devices for controlling the starting and stopping of the system and for facilitating the testing out of the several parts of the system.

The mechanism illustrated on panel F is arranged and adapted for automatically starting the system into operation and is controlled as to starting by the timing device G. As will be explained later, the system can also be started and stopped from remote control stations by simple push button switches, such switches being used in addition to or in place of the automatic starting by the timing device G.

Figure 1:
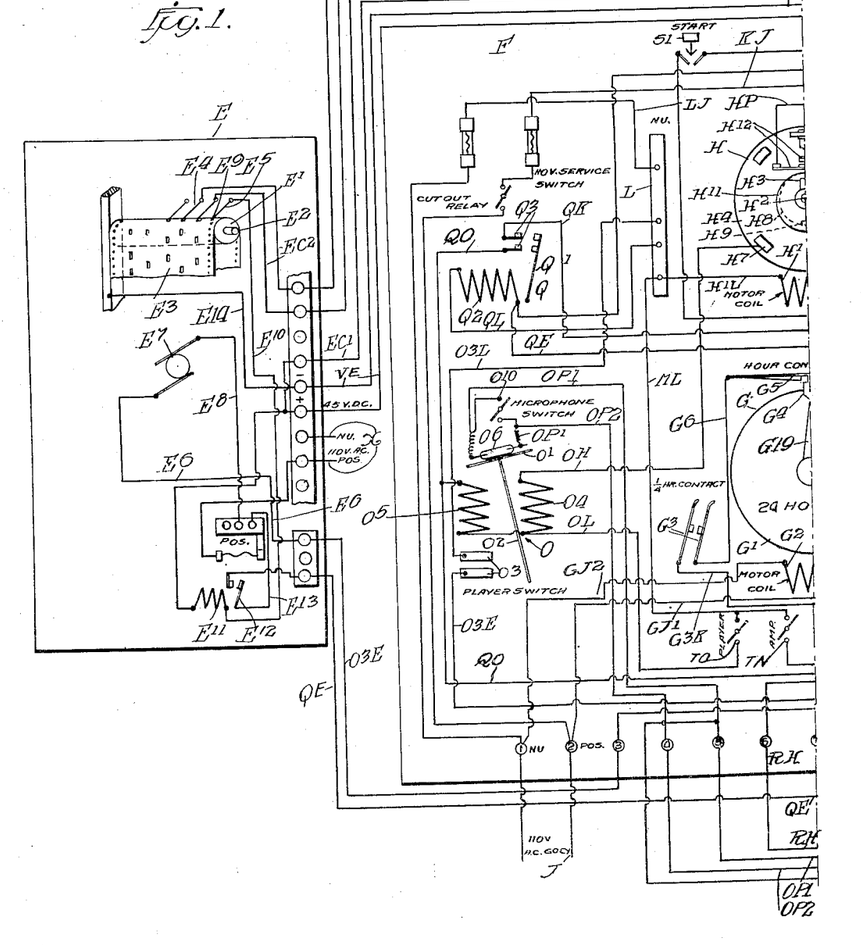
Figs. 1 and 1A constitute an electrical diagram of the several circuits and show diagrammatically the several devices involved in the system which are involved in or are closely related to the essential features of the invention.

The timing device G is preferably provided with a rotating dial or disk G1 which rotates at the rate of one revolution in twenty-four hours. The motor for running the clock is illustrated in Fig. 1 by its field coil G2 which is connected to the main A. C. current supply J by connecting wires GJ1 and GJ2 and these connections are uncontrolled, consequently, the timing device runs all the time that the system is connected to the source of supply of current.

The motor G2 which runs the timing device, as shown in the drawings, is an A. C. motor of the kind which is synchronized with the cycles of the A.C. supply current that it runs at a constant speed and is of the kind which has recently come into common use for running clocks and keeping accurate time.

The main switch device H includes a synchronized motor H1 illustrated in Fig. 1 by its field coil and the device is provided with a rotatable shaft H2 which is suitably geared to the shaft of the motor H1 so that the shaft H2 rotates accurately at the rate of one revolution in one minute. Rigidly mounted on the shaft H2 is a switch arm H3 and the device is provided with a circular plate H4 of suitable insulation material and upon the face of which are mounted a series of contacts H5, H6 and H7, preferably near the periphery of the plate and arranged to be contacted by the arm H2 as it is rotated, first contacting with H5, then fifteen seconds later with H6, and then fifteen seconds later with H7.

Rigidly mounted on the shaft H2 is a metal contact disk H8 which is provided at one point in its periphery with an open notch H9 and a yielding contact arm H10 is provided to contact with the periphery of the disk H9 after the shaft H2 has started and has rotated but a very little. When the shaft H2 is at rest, as shown in the drawings, the co-operating end of the contact arm H10 is positioned in the notch H9 free of the disk and consequently the circuit is open at this point. The function of this circuit closing device is to keep the motor H1 running after it has been otherwise started and to stop it at the end of one revolution of the shaft H2.

A cam H11 of insulating material is also rigidly mounted on the shaft H2 and arranged above the shaft H2 are a pair of circuit closing contacts H12 which the cam H11 is adapted to close together as the shaft H2 rotates, for the purpose of short circuiting the microphone to prevent its operation until the system is ready for the amplification of the desired sounds. These contacts are normally open when the system is not in operation and the cam is arranged to close them before the amplifying tubes are ready to operates and to open them again just after the filament circuit of the microphone has been closed.

In connection with the clock G are a pair of contacts G3 which, as more fully described later, are arranged and adapted to be closed each quarter hour.

The twenty-four hour dial G1 of the timing device G carries on its periphery a number of projections G4, as will be explained more fully hereinafter. These projections are adjustable around the periphery.

These projections are adapted to make contact with a yielding contact arm G5 when they are at the top of the dial. The dial and contacts are grounded on the clock mechanism and the contact G5 is connected by a wire G6 to one of the pair of contacts G3. The other contact G3 is connected by a wire G3K to a positive bus bar K which is connected by a circuit wire KJ to the positive side of the supply J. A circuit wire GH connects the clock frame work with one end of the field coil of the switch motor H1 and the opposite end of the field coil of the motor H1 is connected by circuit wire H1L to the neutral bus bar L which is connected by a circuit wire LJ to the neutral side of the supply J.

When the dial G1 has rotated to a position where a projection G4 touches the contact G5 and at the same time, the pair of contacts G3 are closed, current passes from the positive bus bar through the wire G3K, the contacts G3, the contact G5, the projection G4 and clock frame, the wire GH, motor coil H1 and wire H1L to the opposite bus bar and the motor H1 is started.

The motor rotates the contact disk H8 and before the contacts G3 open again the disk H3 rotates far enough to cause the arm H10 to contact with same.

The frame of the device H is connected by a wire HK, with the wire G3K which is connected with the positive bus bar K, and the arm H10 is connected by a wire H12 with the same end of the field coil of motor H1 that the wire GH is connected with. When the disk H8 rotates far enough to contact with the arm H10, which it does before the contacts G3 open, current is supplied to the motor H1 from the positive bus bar through the wire G3K, wire HK, disk H8, arm H10 and wire H13, and the motor continues to run until the circuit is broken by the free end of the arm H10 dropping into the notch H9 in the edge of the disk H8. As will be explained, the contacts G3 have opened soon after the contact is made by the disk H8 and arm H10, so that as soon as the circuit is broken between the disk and arm, the motor stops and all the parts are set ready to be started again by a projection G4 on the dial G1 and the contacts G3.

As explained, the arm H3 is geared to the motor H1 to be rotated by same and the arrangement is such that the arm swings around once in a minute.

The several contacts H5, H6 and H7 with which the arm H3 co-operates, are connected with electro-magnet switches, M, N and O, respectively, and as the arm H3 successively makes contact with the several contacts H5, H6 and H7, the several electro-magnetic switches M, N and O are successively operated.

Each of these switches preferably comprise two operating magnetic coils which can be alternately energized to cause the switches to close a circuit or to open or break a circuit.

Figure 1A:
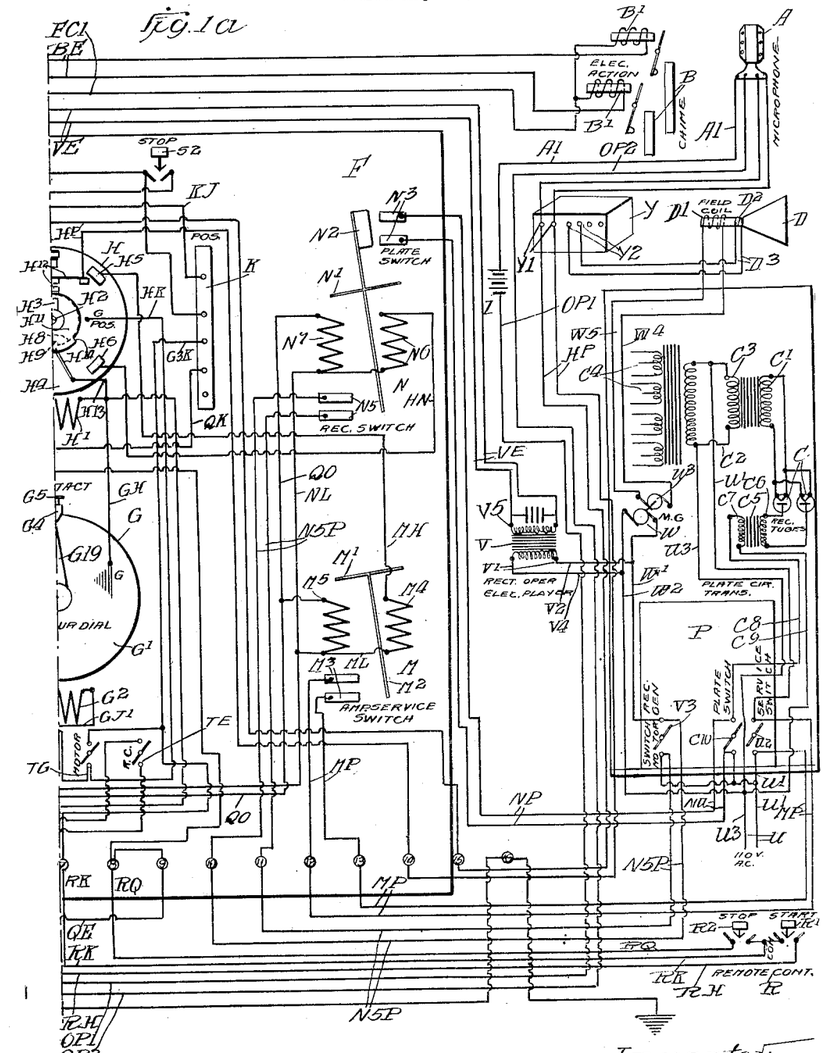
Figure 2:
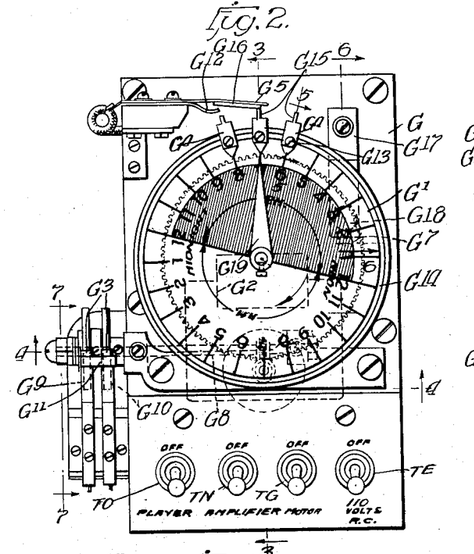
Fig. 2 is a front view of a novel time or clock mechanism for periodically initiating the system starting mechanism.
Figure 3:
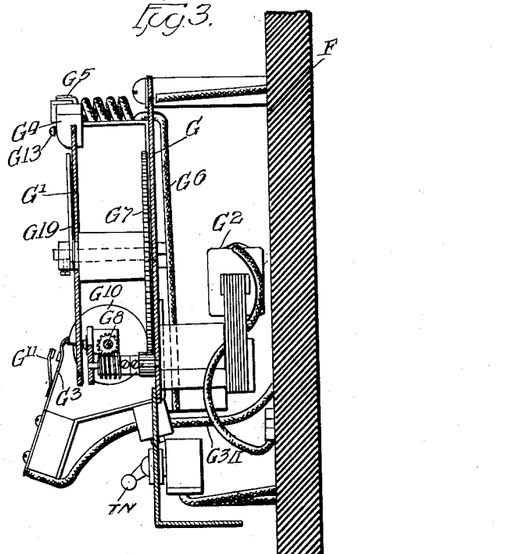
Fig. 3 is a vertical section substantially on the line 3—3 of Fig. 2.

For instance, the switch M has, see Fig. 1A, a swinging armature M1 which carries a switch blade M2 adapted to be swung to close on a pair of contacts M3 to close the circuit controlled by this switch. The switch has a closing coil M4 and an opening coil M5. The closing coil M4 is connected by a wire MH to the first contact H5 with which the arm H3 makes connection as it is moved around by the motor H1. As explained, the arm H3 through the frame of the device H is connected to the positive bus bar K through the wire HK and consequently, when the arm H3 touches the contact H5, current passes from the positive bus bar K to the closing coil M4 of the switch M.

The opposite end of the coil M4 is connected by a circuit wire ML to the negative bus bar L and consequently the coil M4 is energized when the arm H3 touches the contact H5 and the switch blade M2 is swung over connecting the two contacts M3, which sends the supply current into the amplifying tubes to heat them and also sends the supply current into the several devices such as transformers and rectifiers of the first stages of amplification.

As the arm H3 moves on, it passes over and in contact with the second contact H6, after an interval of fifteen seconds. The switch N which is operated through the second contact H6 has a swinging armature N1, a switch blade N2 is secured thereto and adapted to be swung to connect two contacts N3 to close a circuit for sending the high voltage into the amplifying tubes. The armature carries a second switch arm N4 arranged to connect two contacts N5 for closing a rectifier circuit for operating the player E and also for supplying current to the rectifiers or motor generators for the purpose of supplying D. C. current to the field coils of the loud speaker units.

The switch N has a closing coil N6 and an opening coil N7. The contact H6 is connected to one end of the closing coil N6 by a circuit wire HN and the circuit is completed through the coil N6 by a circuit wire NL which connects the opposite end of the coil to the bus bar L.

Figure 19:
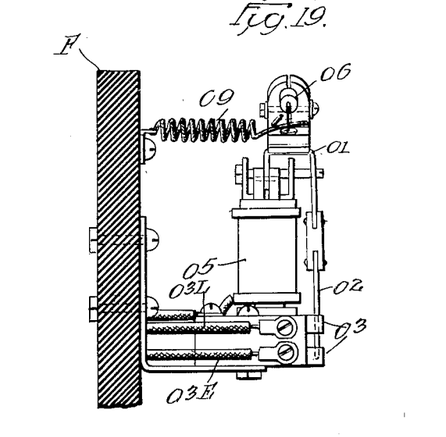
Fig. 19 is a side elevation of the device shown in Fig. 18.
Figure 20:
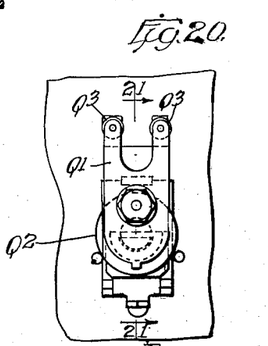
Fig. 20 is an end elevation of an electro-magnetic kick-off device shown in Fig. 1 and used for opening the several operating switches and stopping the mechanism.
Figure 21:
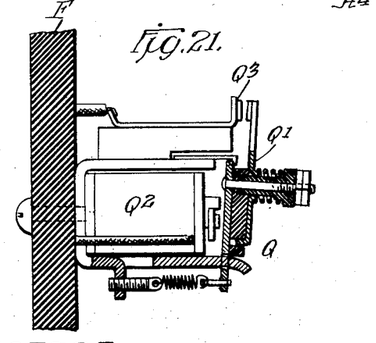
Fig. 21 is a vertical section on the line 21—21 of Fig. 20.

The electro-magnetic switch O has, see Figs. 1 and 19, a swinging armature O1 which carries a switch blade O2 arranged and adapted to connect a pair of contacts O3 for closing the electric supply circuit for the player E and starting it into operation. The switch O has a closing coil O4 and an opening coil O5. One end of the closing coil O4 is connected by a circuit wire OH to the contact H7 and the coil circuit is completed through the coil by a circuit wire OL which connects the opposite end of the coil to the bus bar L. When the arm H3 touches the contact H7, the closing coil O4 of the switch O is energized and the blade O2 is swung to connect the two contacts O3 to start the player E.

One of the terminals O3 is connected by a circuit wire O3L to the negative bus bar and the other by a circuit wire O3E leads to the player E.

In addition to the panel F and the player E, the system includes a panel P for the amplifying tubes, transformers, etc., and in connection with this panel there is a box Y which contains the amplifying devices which are used to accomplish the various stages of amplification. These devices are illustrated diagrammatically in Fig. 1A by the box Y.

The contacts H12 are connected into the box Y by the circuit wires HP for the purpose of short circuiting the microphone so that no unwanted sounds or impulses can be picked up for amplification until the system is ready and the player starts.

As the arm H3 swings around, the cam H11 rotates with it and before the arm H3 closes the player circuit, the cam has closed the contacts H12 together and thus short-circuited the microphone. The cam H11 has a single tooth H14 and the arrangement is such that just as the arm H3 closes the player circuit, the tooth H14 of the cam H11 passes by the contacts H12 permitting them to separate and free the microphone of the short circuit so that it can pick up the music produced by the player.

For the purpose of closing the filament circuit of the microphones, at a proper time in relation to the closing of the other operating circuits, the switch device O is provided with a simple microphone switch. This consists, as shown in the drawings, of a mercury switch tube O6 secured on the armature O1 and adapted to be tilted to close a circuit when the switch blade is swung to connect the contacts O3 and to open the circuit when the blade O2 is withdrawn from the contacts O3.

The tube O6 as usual, contains mercury and circuit wires are entered into the tube at the opposite ends thereof. When the tube is tilted, as shown in Fig. 1, the mercury does not connect the two circuit wires but when it is tilted in the opposite direction, that is, when the blade O2 is swung to connect the contacts O3, the mercury connects the two circuit wires and closes the circuit. One of the contact wires of the mercury switch is connected by a circuit wire OP1 to the microphone battery and the other by a wire OP2 to a post on the panel P for connection to the microphone.

With the arrangement of apparatus shown and described, at the time the player is started, the microphone is relieved of the short circuit, and the microphone battery circuit is closed and as the tubes are already in operative condition, the system operates to play the music, pick it up, amplify it and send it out through the loud speakers.

The operative circuits closed by the several automatic switches M, N and O will be more fully described herein.

As explained hereinbefore, each of the automatic switches M, N and O have an opening coil for use in stopping the operation of the mechanism. For energizing these stopping coils, there is provided a stopping switch Q which includes a swinging armature Q1 and a magnet coil Q2. When the coil is energized, the armature is drawn up and connects two terminal contacts Q3. One end of the coil Q2 is connected by a circuit wire QL to the bus bar L, and the opposite end of the coil is connected by a circuit wire QE with player E which is arranged and adapted to energize the coil Q2 and cause the terminals Q3 to be connected when the program has been completed. The operation of the player to accomplish this will be more fully described hereinafter.

One of the terminals Q3 is connected by a circuit wire QK to the positive bus bar K and the other terminal is connected by a circuit wire QO with one end of the closing coil O5 of the switch device O. The opposite end of the coil O5 is connected to the circuit wire OL which leads to the negative bus bar L, so that when the coil Q2 of the switch device Q is energized by the player E, the opening coil O5 of the switch device O is energized and the switch O is operated to break the circuit at the terminals O3. The circuit wire QO leads on from the switch device O successively to the switches M and N and in each instance is connected to one end of the stopping coil in each. The opposite end of each stopping coil, as in the case of the coil O5, is connected by circuit wires ML and NL to the bus bar L so that when the terminals Q3 are connected, the opening coils of the several automatic switches are energized and all of the switches are operated to open the operating circuits which had previously been closed by them. In this stopping action, all of these main circuit switches are opened simultaneously.

Besides the automatic means described for initiating the automatic procedure for starting the system, manually operable means are provided by which the starting of the system can be initiated from remote stations.

For this purpose circuit wires are provided which extend to one or more remote control stations R. At each station preferably two control circuit closing switches R1 and R2 of the push button type are provided. R1 is for starting the system and R2 for stopping the system. A common circuit wire RK connects the switches to the positive bus bar K. A circuit wire RH leads from the starting button R1 to the coil H1 of the motor which operates the main switch arm H3 so that when the circuit is closed by the button R1, the motor H1 is started and this initiates the operation of starting the system through the automatic circuit closing switches before described.

As previously explained, if the player E is operating, the system is stopped automatically at the conclusion of the program but if the broadcast is from some other source and it is started by the push button R1, it can be stopped by the push button R2. This stop switch is connected by a circuit RQ with the circuit wire QE by which the kick-off coil Q2 is controlled and the stopping of the system is in the same manner as though it was controlled by the player.

Other start and stop push button switches can obviously be arranged at other stations as, for instance, conveniently on the main panel F where is shown a starting push button S1 and a stopping push button S2. The starting button S1 is connected in circuit with the motor coil H1 and the stopping button S2 connected in circuit with the coil of the kick-off switch Q, as explained in reference to the push button switches R1 and R2.

As mentioned before, the main operating circuits are arranged so that anyone of them can be made inoperative to permit the use or testing of the other circuits.

For this purpose, manual circuit opening and closing snap switches TO, TN, TG and TE are provided.

The switch TO is cut into the circuit wire OL, which connects the coils of the switch O with the bus bar L, and consequently when the switch TO is open, the switch O cannot function.

The switch TN is cut into the circuit wire ML which connects the two switches M and N to the bus bar L and consequently when this switch is open, neither of the switches M nor N can operate.

The switch TG is cut into the circuit wire G3K which connects the positive bus bar K with the clock closing contacts and also by the wire HK with the ground wire to the main switch mechanism H and consequently when this switch TG is open, the action cannot be automatically initiated.

The switch TE is cut into the circuit wire O3E which connects the switch O with the player so that when this switch TE is open, the player will not start even if the switch O is closed, to close the battery switch O6 which forms a part of the switch O.

While the present invention is concerned chiefly with the automatic mechanism shown in relation to the panel F, it is thought best to illustrate and describe the results effected in the starting of the system by the operation of said automatic switching mechanism.

The result to be attained is to first heat the filaments of the high voltage rectifying tubes, then later apply the high voltage to the plate circuit of the tubes.

These high voltage rectifying tubes are designated C and while two are shown, one or more may be used.

The panel P is provided with a 110 volt A. C. current supply U. In one wire U1 of this supply, a manual switch U2 is inserted and the switch is spanned by the wires MP leading from the terminals M3 of the switch M to the panel P so that when the switch M is closed, the same effect is produced as closing the switch U2. The filament circuit of the tubes C includes the secondary C1 of a suitable transformer C2, and the primary C3 of the transformer is connected to the feed wire U. The transformer circuit is completed by the other wire U3 of the 110 volt supply U.

This transformer C3 also supplies through other secondary coils C4, various other circuits for use in the amplifying system but as these parts are the usual parts for such devices, they have not been illustrated particularly as they are not a part of this present invention.

The next step in the starting of the system is to produce and supply to the tubes C the high voltage necessary for their operation. This is accomplished by the closing of the switch N which operates to connect the terminals N3 by the switch blade N2.

A high voltage transformer C5 is provided, the secondary coil C6 of which is in the plate circuit of the tubes C. Circuit wires NP lead from the terminal N3 to the panel P. The primary coil C7 of the transformer C5 is connected to the 110 volt A. C. supply U by circuit wires C8 and C9. The circuit wire C9 has a switch C10 inserted in it and the circuit wires NU span the switch so that when the switch N is closed, the transformer C5 is put into operation supplying the tubes C with the necessary high voltage.

For operating the player E a special current is used, in the form shown this is a 45 volt D. C. circuit, and the closing of the switch N is arranged to close the primary circuit of a transformer for this purpose. This transformer is shown at V and its primary coil V1 is supplied with current from the supply U.

The terminals N5 of the switch N are connected into the panel P by circuit wires N5P. The primary coil V1 of the transformer V is connected through the circuit wire V2 with the supply wire U1. This wire has a manual switch V3 inserted in it. The opposite end of the coil V1 is connected by the circuit wire V4 with the other supply wire U3. The switch is spanned by the circuit wires N5P from the terminals N5 so that when the switch N closes, current is supplied to the transformer V. The secondary coil V5 of the transformer V is connected by circuit wire VE with the player E.

In the operation of the loud speaker D, which represents as many loud speakers as may be necessary in any practical installation, a special D. C. current is necessary. This might be provided by transformers similar to that shown at V but if a large number of loud speakers were to be used, it would be advisable to use a motor-generator for obtaining the necessary D. C. current. A suitable motor generator is indicated at W and the A. C. motor is connected by circuit wires W1 and W2 to the wires V2 and V4 so that when the switch N closes, current will be supplied to the motor generator. The D. C. generator W3 is connected by circuit wires W4 and W5 to the field coil D1 of the loud speaker D. Consequently, when the switch N closes, the field coil of the loud speaker is energized and the loud speaker is ready to operate as soon as the sound pulsations are received from the amplifying devices.

A coil D2 is indicated to be connected by circuit wires D3 to the amplifying devices for causing the loud speaker to operate.

The next operation of the automatic mechanism on panel F is to close the switch O to start the player. It should be understood that while but one sound producing device, viz. the player E, is shown, other devices such as a phonograph or a manual key board might be used and further contacts on the disk H4 provided for operating additional switches for placing them in operation but it is thought sufficient for the present purpose to illustrate and describe the operation of starting the player E and the means by which the player stops the system when the program is completed.

The player E, as shown, comprises principally a metal roller E1 rotatably mounted on a shaft E2. An endless perforated paper band or belt E3 is trained over the roller and metallic circuit closing spring-pressed fingers E4 are arranged in such relation to the roller E1 that when the ends of the fingers project through openings in the paper, they close circuits which include suitable sound producing devices such as the chimes B. One of the fingers E5 is arranged to close a circuit by means of which circuit closer Q is operated to stop the operation of the system.

The player is started by the closing of the main switch O.

As explained, one of the terminals O3 is connected to the neutral bus bar L and the other is connected by the circuit wire O3E to the player and by a circuit wire E6 to a motor E7 which runs the player and by a circuit wire E8 with the positive side of the 110 volt A. C. supply X to the player, thus completing the motor circuit. The player motor E7 starts when the switch O closes to connect the terminals O3.

The playing circuit which includes the roller E1 is completed by the wire E14 which connects the roller E1 with the negative side of the 45 volt supply.

The player motor is stopped by the automatic opening of the motor circuit by the contact finger E5 when it makes contact with the roller E1 through a hole E9 in the music paper E3. The finger E5 is connected by a circuit wire E10 to the positive side of the 45 volt circuit and this circuit wire contains a stop relay E11 by which the player is stopped.

The stop relay E11 when energized through the stop finger E5 closes a pair of contacts E12. One of the contacts E12 is connected by a circuit wire E13 to the positive side of the 110 volt A. C. supply X and the other is connected to the kick-off coil Q2 of the switch Q by the wire QE.

When the relay is operated, the circuit of the kick-off coil Q is closed by the contacts E12 and being thus energized, it operates to open the several switches M, N, and O by the closing of the contacts Q3. When the switch O is opened, the player stops.

The time control circuit closing mechanism G is specifically shown in Figs. 2 to 10, inclusive.

It is preferably run by the synchronized motor G2 which rotates disk G1 through a train of gears G7 and the arrangement is preferably such that the disk G1 makes one revolution in twenty-four hours. In conjunction with the gearing is a transverse shaft G8 which is preferably rotated once in fifteen minutes and this fifteen minute shaft carries at one end two cam disks G9 and G10 by which the contacts G3 are operated. Each of the cams G9 and G10 are of the single tooth kind and the free ends of the contact bars G3 rest upon the cams.

Figures 4, 5, 6, 7, 8, 9, 10:
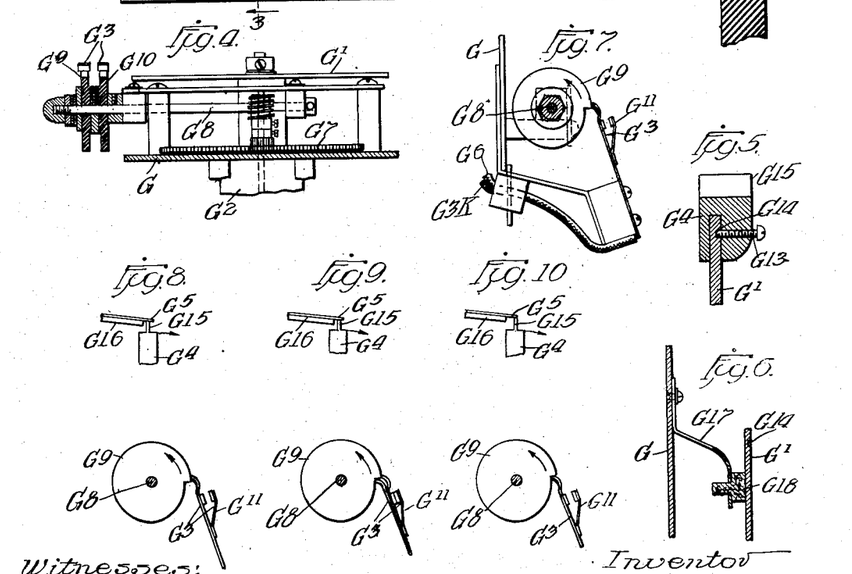
Fig. 4 is a horizontal section substantially on the line 4—4 of Fig. 2.
Fig. 5 is a fragmentary section on the line 5—5 of Fig. 2.
Fig. 6 is a fragmentary vertical section on the line 6—6 of Fig. 2.
Fig. 7 is a vertical section on the line 7—7 of Fig. 2.
Figs. 8, 9 and 10 are associated views of the two circuit closing devices associated with the timing mechanism shown in Fig. 2 and showing the circuit closers in several related and successive positions.

One of the contact bars G3 has a transverse projection G11 near its free end, which projects over the other bar G3 and the circuit closing contact points are between these two overlapping parts. The bars G3 are yieldingly pressed against the peripheries of the two cams which are made of suitable insulation material. The free ends of the contact bars G3 and the teeth on the two cams is such that normally, as best shown in Fig. 8, the contact points are separated. As the cams continue to turn the bar G3 which carries the projection G11 first drops down and makes contact with the other bar. Then after a few seconds, the second bar G3 drops down and the contacts are separated.

As arranged, this action occurs each quarter hour but no effect is had from it unless the circuit is closed at the time by the arm G5 and one of the projections G4.

The contact bar G5 is yieldingly held pressed toward the disk G1 and is limited in its movement toward the disk by a rigid arm G12 arranged beneath it. The projections G4, as best shown in Fig. 5, each are held on the edge of the disk G1 by a set screw G13 the point of which enters a concentric circumferential groove G14 in the face of the disk G1 near its periphery. Each projection G4 has a rigid tongue G15 at its outer end which is adapted to engage beneath the free end of the arm G5 and close the circuit. The arm G5 is shielded on its lower face by a plate G16 of insulation material and this projects toward the free end of the arm G5.

The relation of the outer end of the insulation plate and the tongue G15 of the projection G4 is such that contact is made at this point just before the circuit is closed by the contact arms G3, and the circuit is again broken by the separation of the contacts G3 before the circuit is broken by reason of the further rotation of the disk G1 carrying the tongue G15 beyond the end of the contact arm G5.

For the purpose of taking up all possible back lash in the gearing which rotates the disk G1, a friction brake is provided for the disk. This comprises a spring arm G17 mounted on the frame of the device and provided on its free end with a yielding pad G18 which is yieldingly held against the rear surface of the disk G1, as best shown in Fig. 6.

A fixed pointer or indicator G19 may be arranged in front of the disk G1 to indicate the positions of the tongues G15 when the circuit is closed on the contact G5.

The function of the main switch device H has been explained and the mechanism involved is best shown in Figs. 11 to 15, inclusive.

The motor H1 through suitable gearing, not shown, rotates the shaft H2, upon which the arm H3 is mounted, accurately at the rate of one revolution in one minute. As has been explained, the motor H1 is preferably a synchronized motor and it is started by the timing device G closing the field circuit of the motor. The arm H3 sweeps around over the plate H4 and closes the several circuits to the several electro-magnetic switches in succession as has been described.

The plate H4 is preferably made of suitable insulation material and the contact projections H5, H6, and H7 are mounted rigidly thereon.

Figure 15:
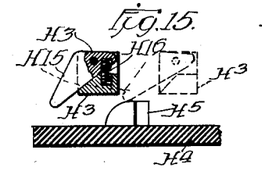
Fig. 15 is a fragmentary horizontal section on the line 15—15 of Fig. 11.

The arm H3 carries on its free end a yieldingly held contact member H15 and as best shown in Fig. 15, this member H15 drags over the contacts H5, H6 and H7 a spring H16 serving to yieldingly hold the free end of the member H15 against the contacts as the arm swings over them.

Figure 11:
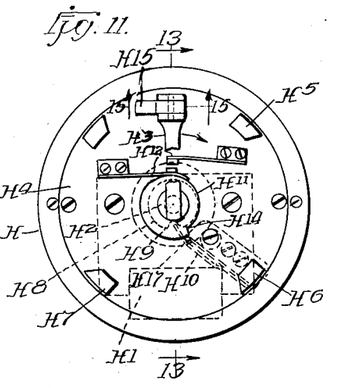
Fig. 11 is a front view of a motor-driven circuit closer arranged to be started by the timing mechanism shown in Fig. 2.
Figure 12:
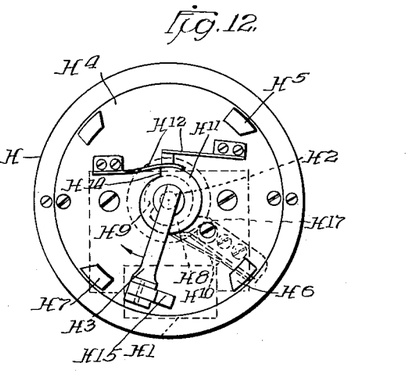
Fig. 12 is a view similar to Fig. 11 but showing the parts in other positions.
Figure 13:
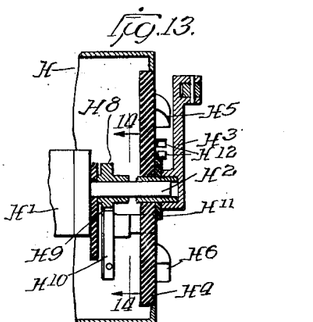
Fig. 13 is a fragmentary vertical section on the line 13—13 of Fig. 11.

As best shown in Figs. 11 and 12, the cam H11 which closes the contacts H12 is arranged to allow the contacts H12 to open practically just as the arm H3 leaves the third switch closing contact H7, there being just sufficient time interval between the closing of the switch circuit connected to the contact H7 to allow the player to start into operation before the short circuit is removed from the microphone by the opening of the contacts H12.

The cam is arranged to close the contacts again substantially when the arm H3 makes contact with the first circuit closing contacts H5 so as to prevent any unwanted noises or impulses getting through to the microphone.

Figure 14:
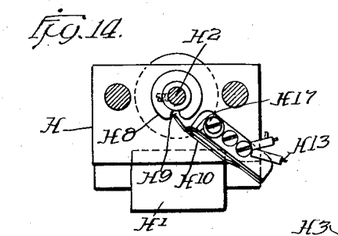
Fig. 14 is a vertical section on the line 14—14 of Fig. 13.

As best shown in Fig. 14, the yielding arm H10 which contacts with the disk H8 and the free end of which drops into the notch H9 to stop the arm H3, is a spring arm and is arranged to yieldingly rest against a rigid stop H17 so that when its free end drops into the notch, it will be accurately held out of contact with the disk H8.

Figure 16:
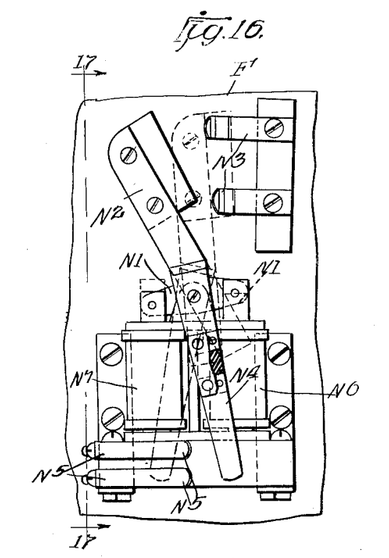
Fig. 16 is a front elevation of one of the several electro-magnetic circuit closing switches which are operated by the motor-driven device shown in Fig. 11.
Figure 17:
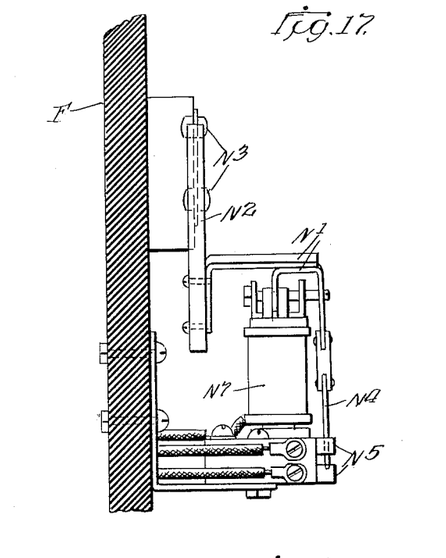
Fig. 17 is a vertical section substantially on the line 17—17 of Fig. 16.

In Figs. 16 and 17, the electro-magnet N is illustrated, the main part of the switch comprising the usual pair of hollow electro-magnets N6 which operate upon plungers N7 to tilt the pivoted armature N1 back and forth. The switch arm N4 depends and its function is to close the starting circuit when the switch is operated by the arm H3, and to open it again when the switch is operated by the kickoff device Q.

In addition to the above, the switch N has the upper circuit closing blade N2 to close the plate circuit by connecting the terminals N3.

Figure 18:
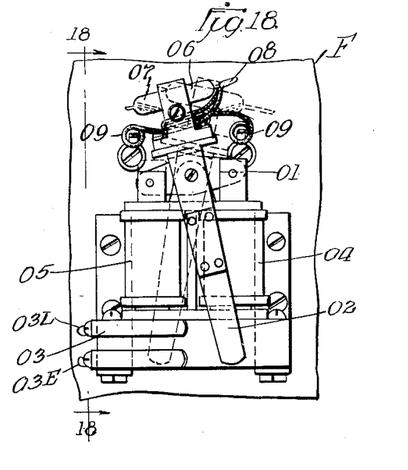
Fig. 18 is a front elevation of another of the electro-magnetic circuit closing switches operated by the motor-driven device shown in Fig. 11.

The electro-magnetic switch O, as best shown in Figs. 18 and 19, is similar to the others but has the mercury circuit closing device O6 secured to the tilting armature O1. This mercury device consists of a glass tube O7 with contact wires O8 sealed in one end and is partly filled with mercury. The circuit wires OP1 and OP2 are connected with these sealed-in wires by fine coil connections O9 to permit the armature to swing freely. The circuit OP1—OP2 also preferably includes a manual switch O10 for opening the circuit for testing purposes.

This mechanism is provided with suitable connection posts by which it is connected into the several circuits, with which it is associated. Among other posts, the posts Y1 are for connecting to the output circuit of the microphone. The posts Y2 are for connecting to the voice coil D2 of the loud speaker D. The microphone is also connected by the circuit wire OP2 to the mercury switch O6 and by a circuit wire A1 to a suitable battery Z, the battery being connected to the mercury switch O6 by the circuit wire OP1.

The short circuiting wires from the contacts H12 are also connected to the microphone so that when these contacts are closed, the microphone is short circuited and prevented from picking up sounds.

The microphone A receives the sound from the chimes B which, as shown, are operated by the player E by means of the electro-magnets B1. The electro-magnets B1 are connected to the player E by the circuit wires BF.

As many modifications of the invention will readily suggest themselves to one skilled in the art, the invention is not limited to the specific arrangement of devices, mechanism and circuits herein shown and described except within the scope of the appended claims.

I claim:

1. In a system of the kind described, and including the necessary electrical devices for receiving sound, amplifying it and dispensing it through loud speakers, a supply of primary A. C. current for operating the system, a filament circuit for the amplifying tubes and transformers and rectifiers for the first stages of amplification, a high voltage circuit for the tubes, a sound production circuit, an electrically operable switch in each circuit, time controlled circuit closing means for initiating the starting of the system into operation, and a power operated switch between the initiating means and the electrically operable circuit switches, a synchronized A. C. motor for operating same, for closing said switches electrically operated switches in a predetermined order and at predetermined intervals of time as and for the purpose specified.

2. The invention as defined in claim 1, an electrically operated player for furnishing sound program for broadcasting through the system, and a kick-off circuit arranged and adapted to be closed by the player at the conclusion of the program for opening said main switches simultaneously.

3. In a mechanism of the kind described, sound amplifying apparatus, a supply of A. C. current, a main control switch arm arranged to swing around in a circle and make one revolution in a minute, contact points spaced around the circle and with which the arm contacts, a synchronous motor for operating the arm, time-controlled means for temporarily connecting the motor to the supply circuit for starting same, other means operable by the motor for connecting same to the supply current before the temporary motor-starting circuit-closer is opened and maintaining the motor connected to the supply current until the arm makes one revolution, means for disconnecting the motor at the end of one revolution of the arm, a series of electrically operable switches connected to the contacts with which the arm cooperates, said electrical switches arranged and adapted at intervals of 15 seconds to successively close circuits for successively applying current to the several operating circuits of a sound amplifying apparatus.

4. The invention as defined in claim 1, the second of the series of electrically operable switches arranged and adapted to close an A. C. circuit to supply current to the high voltage plate circuit of the amplifiers, and to the rectifiers or motor generators, as the case may be, 15 seconds after the first of said series of electrically operated switches has been closed.

5. The invention as defined in claim 1, the player circuit closing electrically operated switch also having means for closing the filament circuit of the microphone substantially simultaneously with starting the player.

6. In a system of the kind described and having a microphone circuit and a microphone filament circuit, means for automatically starting the system into operation and including electrically operable circuit closing switches in the main circuits, a rotatable switch arm and co-operating switch points for operating the said switches successively, means for automatically short circuiting the microphone circuit and later removing the short circuit, and means for automatically closing the microphone filament circuit while the microphone is short circuited.

7. The invention as defined in claim 6, the microphone short circuiting means including a cam operable with the main circuit closing arm and arranged to short circuit the microphone circuit during the rotation of the arm and to open if after the arm has contacted with the last cooperating contact for operating the last of the series of electrically operated circuit switches.

8. In a system of the kind described and including amplifying tubes, a main switch arm, a shaft upon which the arm is rigidly mounted, a supply of A. C. current, a synchronized motor for rotating the shaft by means of said current, means for applying current to the motor for a few seconds to start it, a series of circuit-closing switches, a like series of contacts connected with said switches and adapted to be successively contacted by said arm, a contact disk on said shaft, a contact arm co-operating with the disk to supply current to the motor after it is started, the disk provided with a notch, the free end of the contact arm arranged and adapted to enter said notch and be free of the disk when the shaft is at rest, and to contact with the periphery of the disk after the shaft has turned but a few degrees, the free end of the arm entering said notch and stopping the motor at the end of one revolution.

9. In an electrical sound producing and amplifying apparatus, the combination with means for initially producing sound such as a player, a player operating circuit, amplifying tubes, a filament circuit and a high tension plate circuit for said tubes, of means for automatically closing the filament circuit at predetermined times, and successively closing the high tension plate circuit after a predetermined interval of time, and for closing the player operating circuit after another predetermined interval of time, and means operable electrically by the player mechanism for substantially simultaneously opening the several closed circuits at the conclusion of the arranged program.

FREDERICK B. LITTLE.